US011813518B2

United States Patent
Ishikawa et al.

(10) Patent No.: US 11,813,518 B2
(45) Date of Patent: Nov. 14, 2023

(54) INFORMATION PROCESSING SYSTEM, CONTROLLER APPARATUS, INFORMATION PROCESSING APPARATUS, AND PROGRAM

(71) Applicant: Sony Interactive Entertainment Inc., Tokyo (JP)

(72) Inventors: Kiyotaka Ishikawa, Tokyo (JP); Shin Kimura, Tokyo (JP); Kazuyoshi Enomoto, Tokyo (JP); Takeshi Igarashi, Kanagawa (JP); Tsubasa Umeki, Saitama (JP); Masaaki Tonogai, Chiba (JP); Isao Okuyama, Chiba (JP); Takuro Sawada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 438 days.

(21) Appl. No.: 17/284,054

(22) PCT Filed: Oct. 19, 2018

(86) PCT No.: PCT/JP2018/039095
§ 371 (c)(1),
(2) Date: Apr. 9, 2021

(87) PCT Pub. No.: WO2020/079853
PCT Pub. Date: Apr. 23, 2020

(65) Prior Publication Data
US 2021/0379486 A1 Dec. 9, 2021

(51) Int. Cl.
*A63F 13/214* (2014.01)
*G06F 3/01* (2006.01)
(Continued)

(52) U.S. Cl.
CPC ............ *A63F 13/214* (2014.09); *A63F 13/22* (2014.09); *A63F 13/24* (2014.09); *G06F 3/011* (2013.01)

(58) Field of Classification Search
CPC ........ A63F 13/214; A63F 13/22; A63F 13/24; G06F 3/014; G06F 3/016
See application file for complete search history.

(56) References Cited

U.S. PATENT DOCUMENTS

| 8,428,664 | B1 | 4/2013 | Wyers |
| 9,124,273 | B2 | 9/2015 | Unterreitmayer |

(Continued)

FOREIGN PATENT DOCUMENTS

| JP | 3179614 U | 11/2012 |
| JP | 2013513840 A | 4/2013 |

(Continued)

OTHER PUBLICATIONS

International Search Report for corresponding PCT Application No. PCT/JP2018/039095, 2 pages, dated Nov. 13, 2018.

(Continued)

*Primary Examiner* — James S. McClellan
(74) *Attorney, Agent, or Firm* — Matthew B. Dernier, Esq.

(57) ABSTRACT

Provided is a controller apparatus mounted on a hand of a user, the controller apparatus including a controller body, first sensors arranged at positions on the controller body where a plurality of fingers of the user comes into contact when the user grasps the controller body, the first sensors configured to detect displacement in spatial position between the plurality of fingers of the user and the first sensors; buttons that are arranged at positions where fingertips of the user reach and that is operated by corresponding fingers, and a plurality of second sensors arranged between (Continued)

the first sensors and the buttons and on surfaces of the buttons, the second sensors configured to detect displacement in spatial position between the plurality of fingers of the user and the second sensors.

5 Claims, 7 Drawing Sheets

(51) Int. Cl.
*A63F 13/22* (2014.01)
*A63F 13/24* (2014.01)

(56) References Cited

U.S. PATENT DOCUMENTS

| | | | |
|---|---|---|---|
| 9,201,511 B1* | 12/2015 | Spurlock | G06F 3/0317 |
| 10,534,432 B2 | 1/2020 | Okumura | |
| 10,635,171 B2 | 4/2020 | Nakamura | |
| 10,850,192 B2 | 12/2020 | Machida | |
| 10,963,054 B2 | 3/2021 | Nakagawa | |
| 10,969,867 B2 | 4/2021 | Nakagawa | |
| 2008/0261693 A1 | 10/2008 | Zalewski | |
| 2011/0134034 A1 | 6/2011 | Daniel | |
| 2013/0057299 A1 | 3/2013 | Unterreitmayer | |
| 2015/0035658 A1 | 2/2015 | Provancher | |
| 2017/0235364 A1* | 8/2017 | Nakamura | G06F 3/016 345/156 |
| 2018/0203509 A1 | 7/2018 | Yamano | |
| 2019/0025916 A1 | 1/2019 | Okumura | |
| 2019/0038968 A1 | 2/2019 | Machida | |
| 2019/0278372 A1 | 9/2019 | Nakagawa | |
| 2019/0308097 A1 | 10/2019 | Yamano | |
| 2020/0341549 A1 | 10/2020 | Ishikawa | |
| 2021/0379486 A1 | 12/2021 | Ishikawa | |

FOREIGN PATENT DOCUMENTS

| | | |
|---|---|---|
| WO | 2016038953 A1 | 3/2016 |
| WO | 2017150128 A1 | 9/2017 |
| WO | 2018110432 A1 | 6/2018 |

OTHER PUBLICATIONS

International Search Report for corresponding PCT Application No. PCT/JP2018/039096, 3 pages, dated Nov. 20, 2018.

International Preliminary Report on Patentability and Written Opinion for corresponding PCT Application No. PCT/JP2018/039096, 16 pages, dated Apr. 29, 2021.

International Preliminary Report on Patentability and Written Opinion for related PCT Application No. PCT/JP2018/039095, 11 pages, dated Apr. 29, 2021.

Notification of Refusal for corresponding JP Application No. 2020-551714, 7 pages, dated Nov. 17, 2021.

* cited by examiner (a)

| HAND WIDTH W | MIDDLE FINGER MM | RING FINGER RM | LITTLE FINGER PM |
|---|---|---|---|
| 4 | 22A | 22C | 22D |
| 5 | 22A | 22C | 22F |
| 6 | 22A | 22D | 22F |

(a)

(b)

INFORMATION PROCESSING SYSTEM, CONTROLLER APPARATUS, INFORMATION PROCESSING APPARATUS, AND PROGRAM

TECHNICAL FIELD

The present invention relates to an information processing system, a controller apparatus, an information processing apparatus, and a program.

BACKGROUND ART

Among the controller apparatuses used in a video game console or the like, there is a controller apparatus mounted and used on a hand of a user. A belt or the like is used to fasten and mount the controller apparatus on the hand of the user. When the user extends or bends fingers, the controller apparatus detects bending or extending of the fingers and outputs a signal of operation based on the state of bending and extending of the fingers.

SUMMARY

Technical Problem

However, the size of the hand of the user may vary between users, or the user may not properly wear the controller apparatus. Therefore, the detection of the state of bending and extending of each finger of the user is difficult in some cases.

The present invention has been made in view of the circumstances, and an object of the present invention is to provide an information processing system, a controller apparatus, an information processing apparatus, and a program that can detect a state of bending and extending of each finger of a user.

Solution to Problem

An aspect of the present invention for solving the problem of the conventional example provides a controller apparatus mounted on a hand of a user. The controller apparatus includes a controller body, first sensors arranged at positions on the controller body where a plurality of fingers of the user comes into contact when the user grasps the controller body, the first sensors configured to detect displacement in spatial position between the plurality of fingers of the user and the first sensors, buttons that are arranged at positions where fingertips of the user reach and that is operated by corresponding fingers, and a plurality of second sensors arranged between the first sensors and the buttons and on surfaces of the buttons, the second sensors configured to detect displacement in spatial position between the plurality of fingers of the user and the second sensors.

Advantageous Effect of Invention

According to the present invention, the state of bending and extending of each finger of the user can be detected.

BRIEF DESCRIPTION OF DRAWINGS

FIG. 6 is an explanatory diagram illustrating a setting example of the sensors that detect the fingers in the controller apparatus according to the embodiment of the present invention.

DESCRIPTION OF EMBODIMENT

Figure 1:
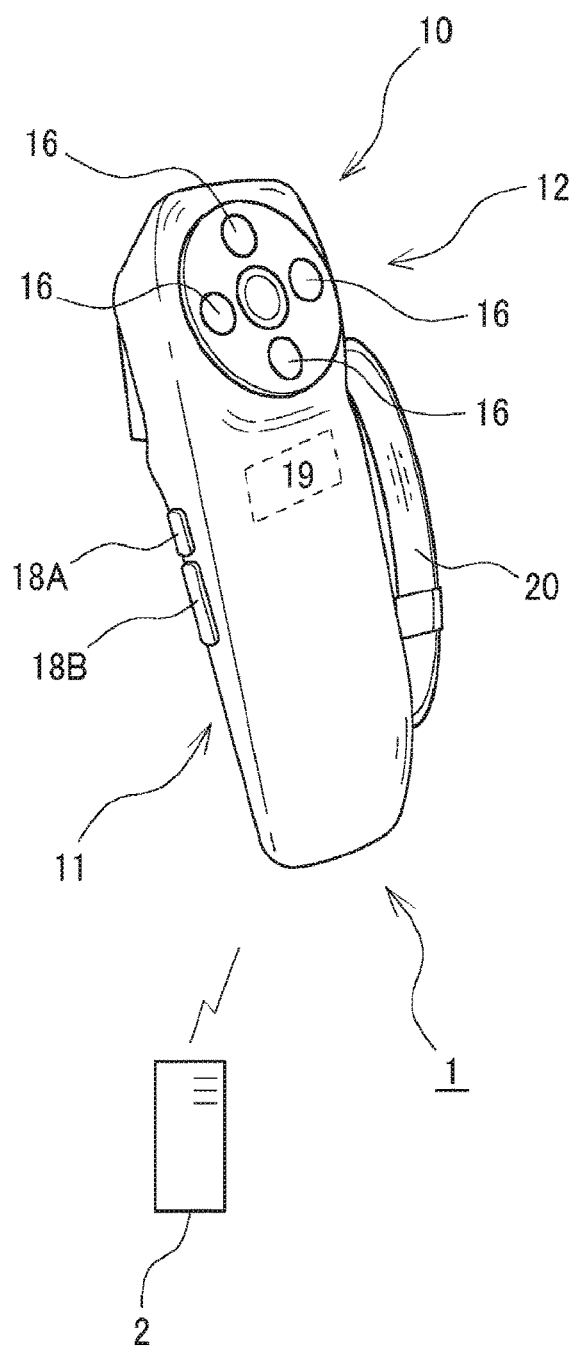
FIG. 1 is a configuration diagram illustrating an outline of a controller apparatus according to an embodiment of the present invention.
Figure 1:
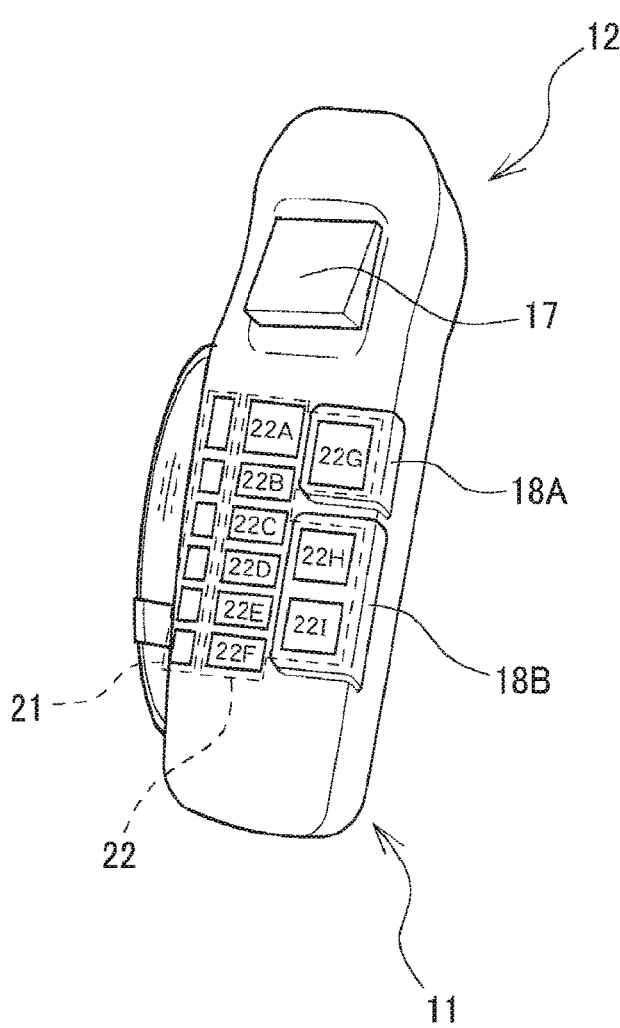

An embodiment of the present invention will be described with reference to the drawings. As illustrated in FIG. 1, a controller apparatus 1 according to the embodiment of the present invention includes a controller body 10 and a fixation tool 20 that maintains a positional relation between the controller body 10 and a hand of a user. The controller apparatus 1 is connected to an information processing apparatus 2 through a wire or wirelessly to allow communicating with the information processing apparatus 2. In the following description of the present embodiment, the sizes of the components, the ratios of the sizes, the arrangements, and the like are examples, and the examples of the present embodiment are not limited to the illustrated sizes, ratios, arrangements, and the like.

Note that FIG. 1(a) is a schematic perspective view of the controller apparatus 1 of the embodiment of the present invention as viewed from slightly left of the front, and FIG. 1(b) is a schematic perspective view of the controller apparatus 1 as viewed from the back side.

The fixation tool 20 of the controller apparatus 1 is, for example, a ring-shaped belt member in which both ends are fixed to the controller body 10. The user puts four fingers from the index finger to the little finger between the fixation tool 20 and the controller body 10 and fastens the belt member of the fixation tool 20 (narrows the gap between the fixation tool 20 and the controller body 10). The controller body 10 is mounted on the hand of the user, with the palm of the hand touching the controller body 10. In such a way, the fixation tool 20 is used to mount the controller apparatus 1 on the hand, and the controller body 10 does not fall off from the hand of the user even if the user gripping the controller body 10 (putting the fingers around the controller body 10 and holding the controller body 10) extends the fingers.

The controller body 10 includes a grip unit 11 that can be gripped by at least some of the fingers (here, from the index finger to the little finger) put into the fixation tool 20 by the user, and an operation unit 12. The grip unit 11 has a substantially polygonal column shape, and the operation unit 12 is formed continuously from the grip unit 11. In addition, the operation unit 12 includes a joystick 15 and a button operation unit 16 on the front side and includes a swing button 17 and buttons 18 on the back side. In addition, the operation device 10 includes a control circuit 19 inside.

The swing button 17 is arranged at a position where the index finger of the user can reach when the user uses the fixation tool 20 to mount the controller apparatus 1 on the hand to grip the grip unit 11. In addition, the joystick 15 and the button operation unit 16 are arranged at positions where the thumb of the user can reach in this case. That is, the user uses the index finger to operate the swing button 17 of the operation unit 12 and uses the thumb to operate the joystick 15 or the buttons included in the button operation unit 16 on the front side.

The buttons 18 are provided on at least one section of the positions on the back side of the controller apparatus 1 where the middle finger, the ring finger, and the little finger can reach when the user uses the fixation tool 20 to mount the controller apparatus 1 on the hand to grip the grip unit 11. The example of FIG. 1 illustrates an example of providing a button 18A operated by the middle finger and buttons 18B operated by the ring finger and the little finger.

In the example of the present embodiment, at least one of second sensors 22 is arranged on the button top (position where the force is applied to press the button) of the button 18. In addition, as illustrated in FIG. 1, the button 18 may be a button arranged on the back side of the grip unit 11, in which the button top is swingable between a protrusion position, which is a position of the surface of the button top, and a pushed position, which is a position after the button is pushed until the button is parallel to the side surface, around an axis of rotation extending in a longitudinal direction of the grip unit 11, in a tangential direction at the position of the axis of rotation on the back side of the grip unit 11. In this case, the second sensor 22 is arranged at a position on the surface of the button 18 where the finger always comes into contact in operating the button 18 (position where the finger comes into contact in the press operation of the button 18 regardless of the length of the finger), such as at a position relatively close to the axis of rotation.

At least one first sensor 21 that outputs a value corresponding to displacement in spatial position between each finger of the user and the first sensor 21 to detect whether or not each finger of the user is close to the surface of the grip unit 11 is arranged at a position on the grip unit 11 where each finger of the user including the middle finger, the ring finger, and the little finger comes into contact when the user uses the fixation tool 20 to mount the controller apparatus 1 on the hand. In an example of the present embodiment, the first sensors 21 are arranged at positions on the grip unit 11 where base parts of the fingers of the user including the middle finger, the ring finger, and the little finger come into contact. The first sensor 21 includes, for example, an electrostatic sensor 21S and a sensor circuit 21T that converts a detection result of the electrostatic sensor 21S into an electrical signal and outputs the electrical signal (these are collectively illustrated as a first sensor 21 in the drawings).

In the example of the present embodiment, a plurality of first sensors 21 is arranged in a line in substantially the longitudinal direction of the grip unit 11 across a length exceeding the average length of the widths of the hands of general adults. Although six first sensors 21 are arranged in a line in the example of FIG. 2, the number is not limited to this.

Furthermore, a plurality of second sensors 22 is arranged at positions on the controller body 10 where the ranges from the pads to the tips of the middle finger, the ring finger, and the little finger of the user come into contact when the user uses the fixation tool 20 to mount the controller apparatus 1 on the hand to grip the grip unit 11. The second sensors 22 output values corresponding to displacement in spatial position between the fingers of the user and the second sensors 22 and detect whether or not the fingers of the user are close to the positions where the second sensors 22 are arranged. The second sensor 22 also includes, for example, an electrostatic sensor 22S and a sensor circuit 22T that converts a detection result of the electrostatic sensor 22S into an electrical signal and outputs the electrical signal (these are collectively illustrated as a second sensor 22 in the drawings).

Note that although the first and second sensors 21 and 22 are electrostatic sensors in the example here, the present embodiment is not limited to this. The first and second sensors 21 and 22 may be cameras, optical sensors, pyroelectric sensors, ultrasonic sensors, or the like as long as information corresponding to the positional relation (displacement in spatial position, such as distance and displacement) between the surfaces of the fingers or the hand and the sensors can be obtained.

Figure 2:
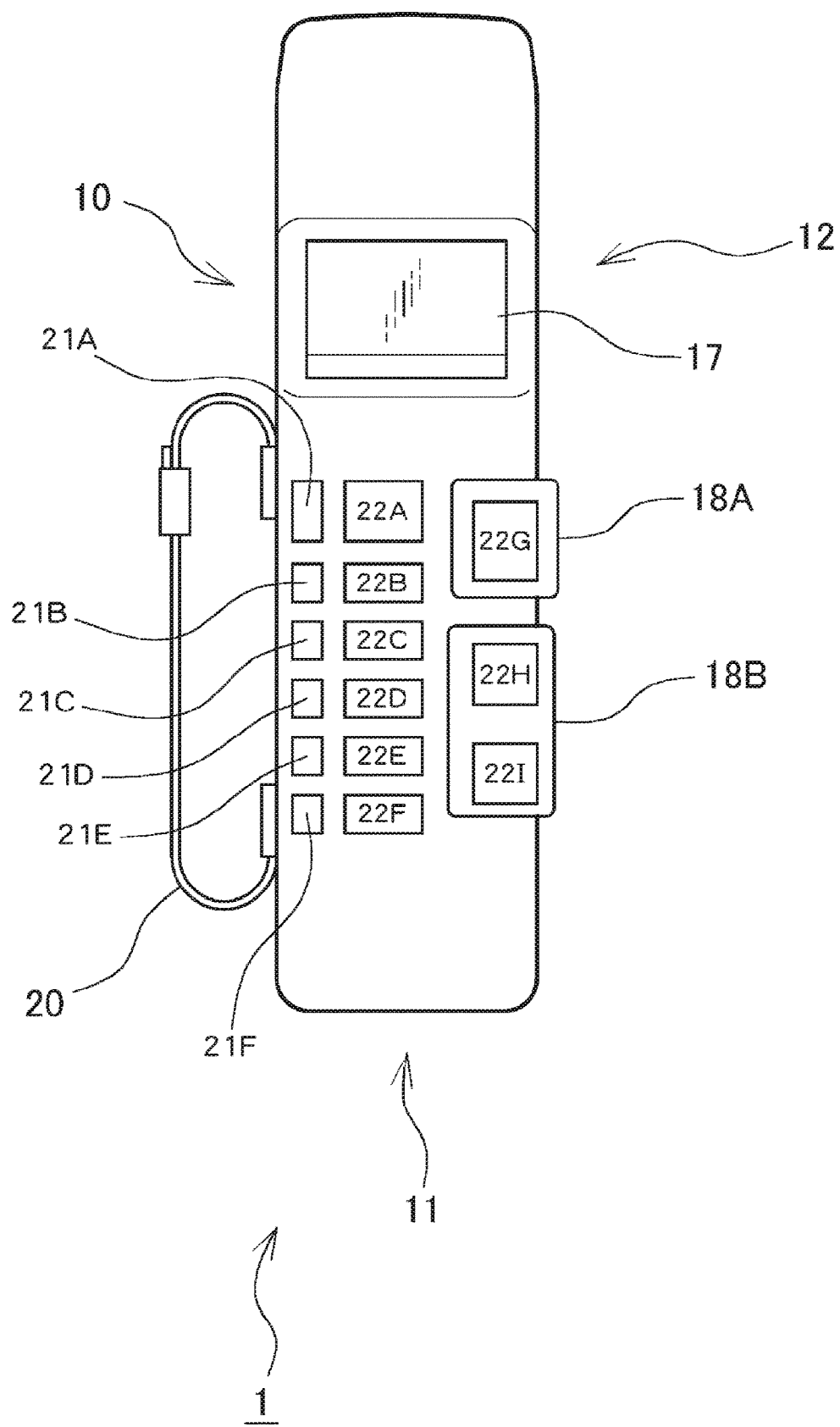
FIG. 2 is an explanatory diagram illustrating an arrangement example of first and second sensors in the controller apparatus according to the embodiment of the present invention.

In an example of the present embodiment, the plurality of second sensors 22 is two-dimensionally arranged. In the example of FIG. 2, two lines of second sensors 22 are arranged in the longitudinal direction of the grip unit 11. There are six second sensors 22 in a first line closer to the first sensors 21, and one or more second sensors 22 of a second line farther from the first sensors 21 are arranged on the buttons 18.

The joystick 15 of the operation unit 12 includes a stick 15S that can be tilted and operated by the user. In an example of the present embodiment, a finger sensor 23 that outputs a value corresponding to the displacement in spatial position with respect to the thumb to detect the position of the finger may be provided at the top of the stick 15S (position touched by the thumb when the user operates the joystick 15).

An electrostatic sensor may be used for the finger sensor 23, similarly to the first and second sensors 21 and 22. Furthermore, the detectable range of the finger sensor 23 may be, for example, a relatively wide angle range from the left surface side to the right surface side of the controller body 10 in the front direction as viewed from the controller body 10, on the front side of the controller body 10, around the normal direction of the surface of the controller body 10. The finger sensor 23 may detect the thumb of the user in the detectable range. In this case, the finger sensor 23 detects the position where the thumb is detected (angle in the angle range), the distance from the finger sensor 23 to the thumb of the user, and the like and outputs detection result information including these pieces of information to the control circuit 19. Examples of the finger sensor 23 include a camera, an optical sensor, an ultrasonic sensor, a pyroelectric sensor, and the like.

The joystick 15 and the button operation unit 16 are tilted or pressed by the thumb and the like of the user. The joystick 15 and the button operation unit 16 output, to the control circuit 19, information indicating the details of the operation, such as information of the tilt direction and the amount of tilt (amount corresponding to the tilt angle) and information indicating the press, along with information for specifying the operated joystick 15 or buttons included in the button operation unit 16.

The swing button 17 is pushed and operated by the index finger of the user, and the swing button 17 outputs information indicating the amount of push (amount of movement of the button) to the control circuit 19. Specifically, although the swing button 17 can include a potentiometer or the like, the configuration is not limited to this as long as the amount of push can be detected.

The button 18 also outputs, to the control circuit 19, information indicating the details of the operation, such as information indicating the press, along with information for specifying the button 18, when the button 18 is pressed and operated by the user.

The control circuit 19 includes a program control device, such as a microcomputer, and operates according to a program stored in storage means, such as a memory. In addition, the control circuit 19 is connected to the first and second sensors 21 and 22, the finger sensor 23, the joystick 15 of the operation unit 12, the button operation unit 16, and the swing button 17 (also the buttons 18). The control circuit 19 receives various signals, such as signals based on the output of the first and second sensors 21 and 22 and the finger sensor 23 and signals indicating the details of the operation input from the joystick 15, the button operation unit 16, and the like, and transmits the signals to the information processing apparatus 2. The control circuit 19 includes, for example, a wireless communication interface, such as Bluetooth (registered trademark), a wired communication interface, such as USB and wired LAN, or the like and transfers various signals to and from the information processing apparatus 2 through the wireless communication interface or the wired interface.

[State of Detection by Sensors]

Figure 3:
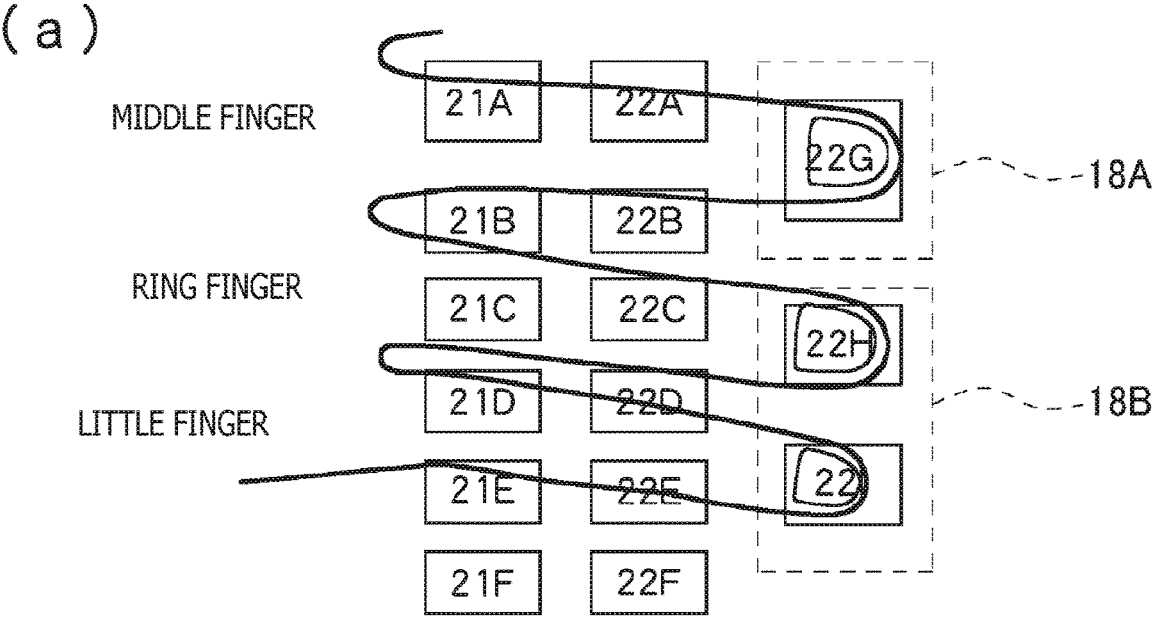
FIG. 3 is an explanatory diagram illustrating examples of detection states of fingers detected by the first and second sensors in the controller apparatus according to the embodiment of the present invention.
Figure 3:
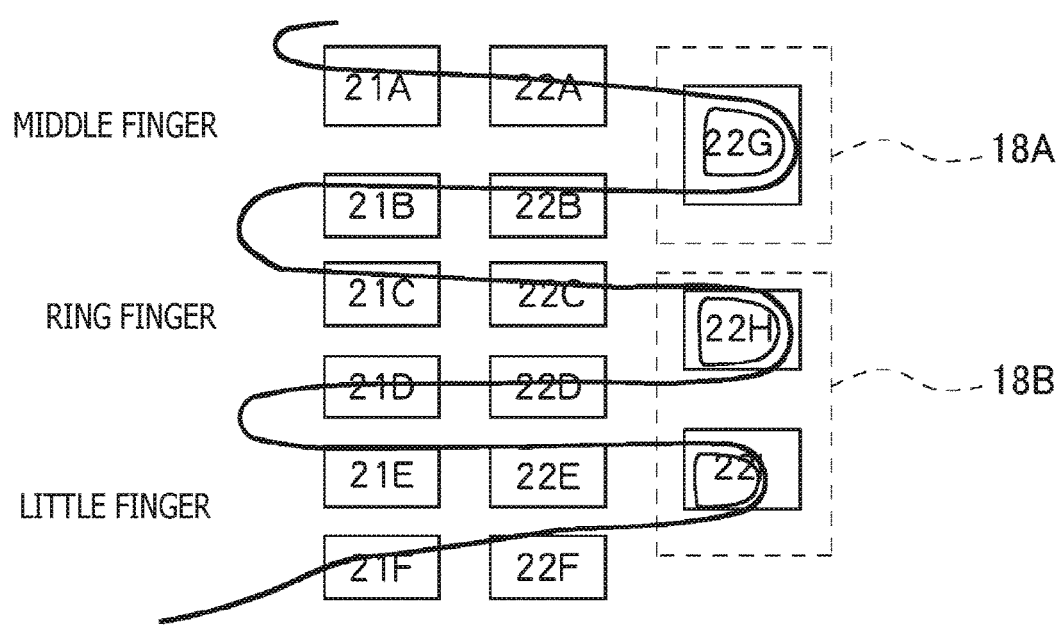

Here, an example of detection by the first and second sensors 21 and 22 for hands of various sizes will be described. FIG. 3(*a*) is an explanatory diagram illustrating a positional relation between the first and second sensors 21 and 22 and the fingers of the user when the user with a relatively small hand grips the grip unit 11 of the controller body 10. FIG. 3 illustrates the hand of the user transparently for the convenience of the description. Note that although the first and second sensors 21 and 22 are actually arranged in a shape of a curve that is the surface of the controller apparatus 1, FIG. 3 schematically illustrates the first and second sensors 21 and 22 projected on a plane.

In addition, FIG. 3(*b*) is an explanatory diagram illustrating a positional relation between the first and second sensors 21 and 22 and the fingers of the user when the user with a relatively large hand grips the grip unit 11 of the controller body 10. Note that in the example of FIG. 3, the first sensors 21 include six first sensors 21A, 21B, . . . 21F sequentially arranged from the index finger side (from the side close to the swing button 17). In addition, the second sensors 22 are arranged in two lines. Six second sensors 22A, 22B, . . . 22F are sequentially arranged from the index finger side in a line closer to the first sensors 21. In a line farther from the first sensors 21, a second sensor 22G is arranged on the button 18A operated by the middle finger, and two second sensors 22H and 22I are arranged on the button 18B operated by two fingers including the ring finger and the little finger in the illustrated example.

As illustrated in FIG. 3(*a*), when the user with a relatively small hand grips the grip unit 11 and places the index finger on a position where the swing button 17 can be pressed, some of the first sensors 21 closer to the swing button 17, such as four first sensors 21A, 21B, 21C, and 21D, detect the contact of the fingers.

As already described, the first sensors 21 are arranged at parts where the base parts of the fingers of the user including the middle finger, the ring finger, and the little finger come into contact. Therefore, regardless of whether or not the user extends or bends the fingers, the first sensors 21A, 21B, 21C, and 21D constantly detect that the fingers are in contact with the surface of the grip unit 11 of the controller apparatus 1 as long as the user can grip the grip unit 11 while wearing the controller apparatus 1.

In addition, while the user grips the grip unit 11 in this state, the second sensors 22A, 22C, and 22D come into contact with the skin at the parts corresponding to the proximal phalanges (parts between the metacarpophalangeal joints (MP) and the proximal interphalangeal joints (PIP) including the proximal phalanges) of the middle finger, the ring finger, and the little finger, respectively, and output signals indicating the state that the fingers of the user are in contact.

Therefore, it is assumed hereinafter that the second sensor 22A is used to detect the state of the middle finger, and the second sensor 22C is used to detect the state of the ring finger (only). It is also assumed that the second sensor 22D is used to detect the state of the little finger (only). The method of selecting the second sensor 22 that detects the state of each finger of the user In such a way will be described later.

Here, when the user extends the fingers a little (extends only the fingertips), the detection state of the fingers detected by the first sensors 21 does not change, and the second sensors 22A, 22C, and 22D output signals indicating that the fingers of the user are in contact. On the other hand, the fingertips are separated from the buttons 18, and the second sensors 22G, 22H, and 22I output signals indicating the distances to the fingertips.

When the user further extends the fingers, the detection state of the fingers detected by the first sensors 21 does not change. However, in the state in which the parts of the pads of the fingers are separated from the grip unit 11, the second sensors 22A, 22C, and 22D output signals corresponding to the displacement in spatial position with respect to the fingers or output signals indicating that the fingers are not detected. In addition, the second sensors 22G, 22H, and 22I output signals corresponding to the displacement in spatial position with respect to the fingertips or output signals indicating that the fingers are not detected. Note that in the example of the present embodiment, an example of the signal corresponding to the displacement in spatial position with respect to the finger or the fingertip output by the second sensor 22 includes a detection value, in which the farther the distance from the second sensor 22 to the fingertip, the smaller the value.

Furthermore, when the user extends only the middle finger, the detection state of the finger detected by the first sensors 21 does not change. However, the second sensors 22A and 22G touched by the middle finger when the user grips the grip unit 11 output signals corresponding to the displacement in spatial position with respect to the fingers or output signals indicating that the finger is not detected. In this case, the second sensor 22B is in contact with both of the middle finger and the ring finger, and as long as one of the fingers is in contact, the second sensor 22B outputs a signal indicating that the finger is in contact. That is, in this state (state in which only the middle finger is extended), the second sensor 22B outputs a signal indicating that the finger is in contact.

In addition, the ring finger and the little finger are in contact with the second sensors 22C, 22D, 22H, and 22I, and the second sensors 22C, 22D, 22H, and 22I output signals indicating that the fingers are in contact.

In addition, when the user with a relatively large hand grips the grip unit 11 and places the index finger on a position where the swing button 17 can be pressed, all of the first sensors 21A, 21B, . . . 21F detect that the fingers are in contact as illustrated in FIG. 3(b). Note that the first sensors are arranged at parts where the base parts of the fingers of the user including the middle finger, the ring finger, and the little finger come into contact. Therefore, regardless of whether or not the user extends or bends the fingers, the first sensors 21A to 21F constantly detect that the fingers of the user are in contact as long as the user can grip the grip unit 11 while wearing the controller apparatus 1.

In addition, while the user grips the grip unit 11 in this state, the second sensor 22A comes into contact with the skin of the part corresponding to the proximal phalange (part between the metacarpophalangeal joint (MP) and the proximal interphalangeal joint (PIP) including the proximal phalange) of the middle finger. The second sensor 22B comes into contact with the skin of the part corresponding to the proximal phalange of the middle finger or the ring finger. The second sensors 22C and D come into contact with the skin of the part corresponding to the proximal phalange of the ring finger. The second sensor 22E comes into contact with the skin of the part corresponding to the proximal phalange of the ring finger or the little finger. The second sensor 22F comes into contact with the skin of the part corresponding to the proximal phalange of the little finger. The second sensors 22A to 22F output signals indicating that the fingers are in contact.

Therefore, it is assumed hereinafter that the second sensor 22A is used to detect the state of the middle finger, and the second sensor 22D is used to detect the state of the ring finger (only). It is also assumed that the second sensor 22F is used to detect the state of the little finger (only) (the method of selecting the second sensors 22 that detect the states of the fingers of the user and other methods will be described later).

Here, when the user extends the fingers a little (extends only the fingertips), the detection state of the fingers detected by the first sensors 21 does not change. However, when the fingertips are separated from the grip unit 11, the second sensors 22A, 22D, and 22F maintain the state of outputting the signals indicating that the fingers are in contact, and the second sensors 22G, 22H, and 22I output signals corresponding to the displacement in spatial position with respect to the fingertips (because the fingertips are separated from the buttons 18).

Furthermore, when the user extends the fingers, the detection state of the fingers detected by the first sensors 21 does not change. However, the parts of the pads of the fingers are separated from the grip unit 11, and the second sensors 22A, 22D, and 22F output signals corresponding to the displacement in spatial position with respect to the fingers or output signals indicating that the fingers are not detected. In addition, the second sensors 22G, 22H, and 22I also output signals corresponding to the displacement in spatial position with respect to the fingertips or output signals indicating that the fingers are not detected.

Furthermore, when the user extends only the middle finger, the detection state of the fingers detected by the first sensors 21 does not change. However, the second sensors 22A and 22G touched by the middle finger when the user grips the grip unit 11 output signals corresponding to the displacement in spatial position with respect to the fingers or output signals indicating that the fingers are not detected.

In addition, the ring finger and the little finger are in contact with the second sensors 22D, 22F, 22H, and 22I, and the second sensors 22D, 22F, 22H, and 22I output signals indicating that the fingers are in contact.

[Sensitivity Setting of Sensors]

Note that to prevent a change in the detection state of the fingers detected by the first sensors 21 even if the bases of the fingers are separated a little from the first sensors 21 when the user completely extends the fingers, it is preferable to set the detection sensitivity of the first sensors 21 higher than the detection sensitivity of the second sensors 22.

Figure 4:
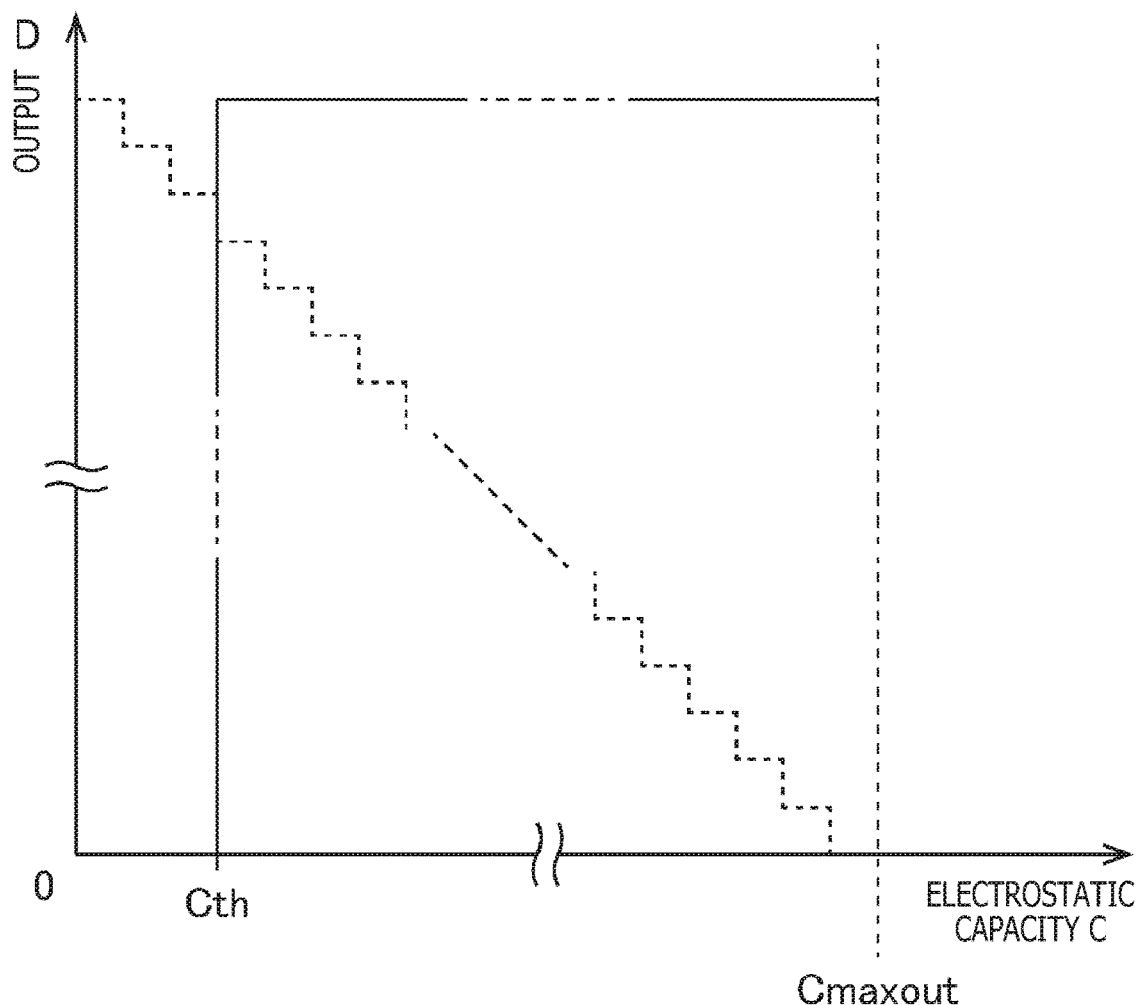
FIG. 4 is an explanatory diagram illustrating examples of output signals of the first and second sensors in the controller apparatus according to the embodiment of the present invention.

Specifically, as illustrated in FIG. 4, the sensor circuit 22T of the second sensor 22 outputs, in multiple stages (for example, as an 8-bit signal), values corresponding to displacement (D) in spatial position with respect to the finger of the user to be detected in accordance with electrostatic capacity (C) of the electrostatic sensor 22S (indicated by a dashed line in FIG. 4). On the other hand, the sensor circuit 21T of the first sensor 21 outputs a digital value "255" that is the maximum value of 8 bits when the electrostatic capacity (C) of the electrostatic sensor 21S exceeds a predetermined threshold Cth, and the sensor circuit 21T outputs a digital value "0" that is the minimum value in other cases.

In such a way, the second sensor 22 outputs the signal in stages according to the closeness of the finger of the user, and the first sensor 21 outputs the same signal as the signal of the case where the finger of the user is in contact when the finger is rather close to the first sensor 21.

[Hysteresis]

Furthermore, hysteresis may be set for the output of the sensor circuit 21T of the first sensor 21. That is, the sensor circuit 21T corresponding to each sensor 21S repeatedly obtains the signal (digital value) based on the electrostatic capacity of the corresponding sensor 21S at each predetermined timing. However, each sensor circuit 21T holds the signals (detection values) obtained in a predetermined number of times in the past (referred to as N times) and outputs predetermined statistical calculation results (for example, maximum value, median value, average value, and the like) for the held signals.

For example, in a case where the maximum value is output in the statistical calculation, the sensor circuit 21T corresponding to the sensor 21S outputs the signal with the maximum value among the signals obtained in N times in the past even when the base of the finger of the user is temporarily separated from the touched sensor 21S. Therefore, the sensor circuit 21T assumes that the base of the finger of the user is in contact and continues to output the signal unless the state that the base is not in contact continues for a long time.

[Selection of Sensors]

Figure 5:
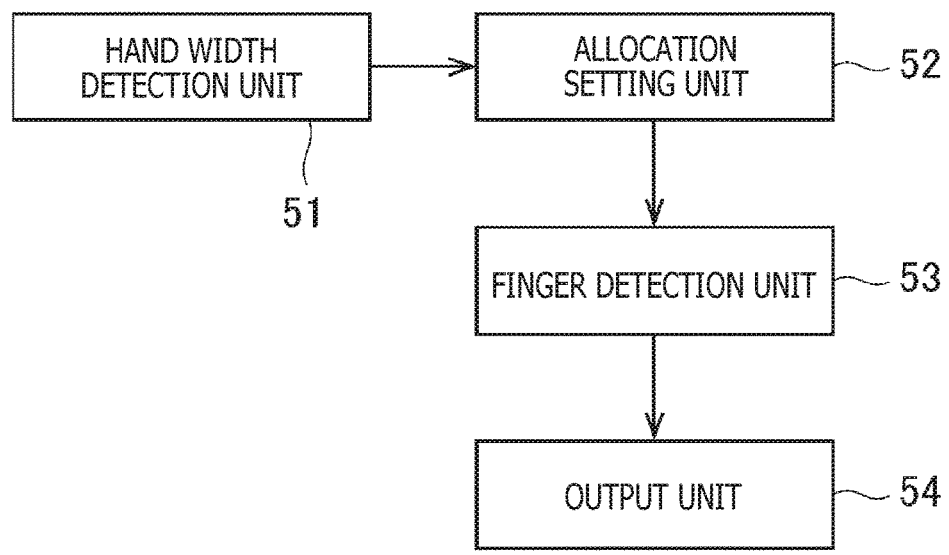
FIG. 5 is a functional block diagram illustrating an example of the controller apparatus according to the embodiment of the present invention.

In addition, the control circuit 19 operates as follows in an example of the present embodiment. The control circuit 19 according to an example of the present embodiment executes a held program to provide functions including a hand width detection unit 51, an allocation setting unit 52, a finger detection unit 53, and an output unit 54 as illustrated in FIG. 5.

Note that as already described, the control circuit 19 processes signals obtained from the joystick 15, the button operation unit 16, the swing button 17, and the like. Widely known processes can be adopted for the processes, and the details will not be described here.

The hand width detection unit 51 obtains signals output by the first sensors 21 to estimate the width of the hand of the user. Specifically, the hand width detection unit 51 resets a counter to "0" and then sequentially checks the output signals of the first sensors 21 (signals indicating the electrostatic capacity of the corresponding sensors 21S, that is, detection values) from the first sensor 21A arranged on the index finger side (swing button 17 side).

Furthermore, the hand width detection unit 51 increments the counter by "1" if the checked first sensor 21 detects the contact of the finger (if the detection value output by the checked first sensor 21 exceeds a predetermined threshold for contact determination). In addition, when the hand width detection unit 51 finds, for the first time, the first sensor 21 that does not detect the finger (the first sensor 21 in which the output detection value is below the predetermined threshold for contact determination) or finishes checking the first sensors 21 up to the last first sensor 21, the hand width detection unit 51 outputs the value of the counter at this point as information indicating the hand width.

For example, four first sensors 21A, 21B, 21C, and 21D detect the contact of the fingers, and the first sensors 21E and F do not detect the contact of the fingers in the example of FIG. 3(*a*) illustrating the case in which the user with a relatively small hand grips the grip unit 11.

In this case, the hand width detection unit 51 sequentially checks the output from the first sensor 21A, and at the first sensor 21E, finds, for the first time, the sensor that does not detect the contact of the finger. Therefore, the hand width detection unit 51 determines that the first sensors 21A, 21B, 21C, and 21D detect the contact of the fingers and increments the counter by "1" for each. The hand width detection unit 51 outputs a value "4" of the counter that is a value at the time that the first sensor 21E is checked.

Furthermore, all of the first sensors 21A to 21F detect the contact of the fingers in the example of FIG. 3(*b*) illustrating the case in which the user with a relatively large hand grips the grip unit 11. In this case, the hand width detection unit 51 increments the counter while sequentially checking the output of the first sensors 21 from the first sensor 21A. The hand width detection unit 51 determines that the last first sensor 21F also detects the contact of the finger and increments the counter. Therefore, the hand width detection unit 51 determines that all of the first sensors 21A to 21F detect the contact of the fingers and increments the counter by "1" for each. The hand width detection unit 51 outputs a value "6" of the counter that is a value at the time that the last first sensor 21F is checked.

The allocation setting unit 52 refers to the value output by the hand width detection unit 51 and selects, from the plurality of second sensors 22, the second sensors 22 that detect bending and extending of the middle finger, the ring finger, and the little finger of the user, respectively. The allocation setting unit 52 outputs information for specifying the selected second sensors 22.

Specifically, the allocation setting unit 52 stores, in advance, information for specifying the second sensor 22 (one of the second sensors 22A to 22F arranged between the first sensors 21 and the buttons 18 in the present embodiment) that detects bending and extending of each of the middle finger, the ring finger, and the little finger of the user in association with the value output by the hand width detection unit 51 (FIG. 6).

In the example of FIG. 6, information MM, RM, and PM for specifying the second sensors 22 that output the signals (detection values) corresponding to the displacement in spatial position with respect to the parts corresponding to the proximal phalanges of the middle finger, the ring finger, and the little finger, respectively, is held in association with the values (W) output by the hand width detection unit 51.

FIG. 6 illustrates a specific example including settings corresponding to the example illustrated in FIG. 3, and various methods, such as an empirical method, can be used to determine the settings. The manufacturer of the controller apparatus 1 determines the settings in advance and stores the settings in the memory of the control circuit 19. Note that the settings may be rewritten by an instruction input from the information processing apparatus 2 or the like.

In the following example, the information for specifying the second sensors 22 that detect the parts corresponding to the proximal phalanges in accordance with the values (W) output by the hand width detection unit 51 is stored, and the second sensors 22A to 22F output signals (detection values) corresponding to the displacement in spatial position with respect to the parts corresponding to the proximal phalanges of the middle finger, the ring finger, and the little finger.

The finger detection unit 53 obtains the information output by the allocation setting unit 52 and selectively outputs information indicating the state of bending and extending of each finger of the user based on the output of the second sensor 22 specified in the information.

For example, it is assumed that the allocation setting unit 52 sets the information MM, RM, and PM for specifying the second sensors 22 that detect the displacement in spatial position with respect to the parts corresponding to the proximal phalanges of the middle finger, the ring finger, and the little finger, respectively, to output the information for specifying the second sensors 22A, 22C, and 22D, respectively. In this case, the finger detection unit 53 selects and outputs the information output by the second sensor 22A as information indicating bending and extending of the middle finger, selects and outputs the information output by the second sensor 22C as information indicating bending and extending of the ring finger, and selects and outputs the information output by the second sensor 22D as information indicating bending and extending of the little finger.

In this case, the signals output by the second sensors 22B, 22E, and 22F are discarded (not output) in the process of the finger detection unit 53. The output unit 54 transmits the information output by the finger detection unit 53, detected by the second sensors 22 selected by the allocation setting unit 52, and corresponding to the displacement in spatial position with respect to the fingers (handled as information indicating the state of bending and extending of the middle finger, the ring finger, and the little finger) to the information processing apparatus 2.

That is, the fingers come close to or come into contact with the grip unit 11 of the controller apparatus 1 if the fingers are bent. Therefore, in a case where the detection value that is a signal output by the second sensor 22 selected as a sensor corresponding to each finger is a value that increases with a decrease in the distance between the finger and the sensor 22, and the detection value is the maximum value when the finger is in contact with the sensor 22, the magnitude of the detection value can also be used as information indicating the level of bending and extending of the finger.

[Another Example of Position Estimation of Fingers]

Furthermore, in the description so far, the control circuit 19 estimates the width of the hand based on the number of first sensors 21 that detect the contact with the hand of the user. The control circuit 19 selects the second sensors 22 that output information regarding the fingers based on the estimation result of the width of the hand and uses the detection values output by the selected second sensors 22 to obtain the state of bending and extending of the fingers. However, the present embodiment is not limited to this.

In an example of the present embodiment, the control circuit 19 executes a held program to provide functions including a hand width detection unit 61, an allocation setting unit 62, a finger detection unit 63, and the output unit 54, similar to the functions illustrated in FIG. 5. Note that the same reference signs are provided to the components similar to the components already described, and the details will not be described.

Figure 7:
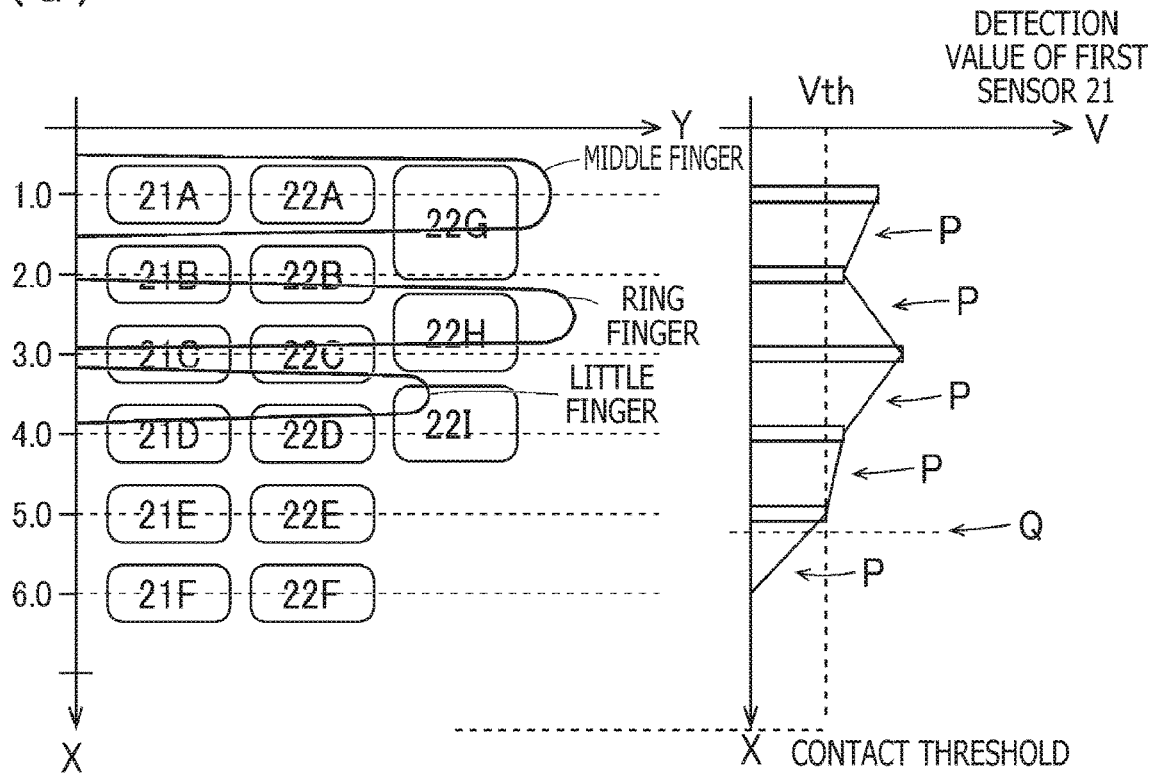
FIG. 7 is an explanatory diagram illustrating another example of the setting of the sensors that detect the fingers in the controller apparatus according to the embodiment of the present invention.
Figure 7:
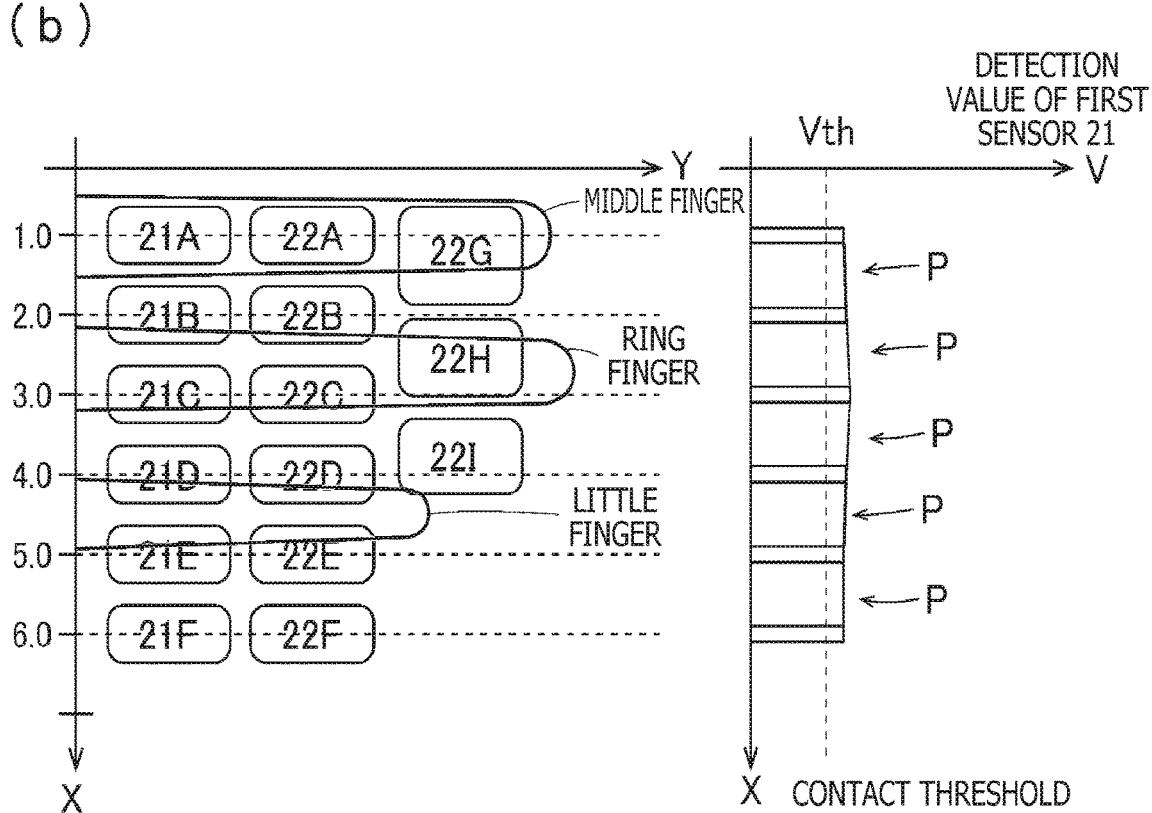

Furthermore, in the following description, the hand width detection unit 61 and the like realized by the control circuit 19 use an XY Cartesian coordinate system to express a two-dimensional area provided with the first sensors 21 and the second sensors 22 and uses coordinates (x, y) in the XY Cartesian coordinate system to express the positions and the ranges of the first sensors 21 and the second sensors 22 as illustrated in FIG. 7(*a*) or FIG. 7(*b*).

Specifically, in the following description, the position of the rectangular first sensor 21A in the X-axis direction arranged at the position corresponding to the base of the middle finger when the user naturally grips the controller apparatus 1 will be referred to as "1.0," the position of the first sensor 21B in the X-axis direction will be referred to as "2.0," . . . and the position of the first sensor 21F in the X-axis direction will be referred to as "6.0."

In addition, the position in the Y-axis direction corresponding to the end on the opposite side of the side provided with the second sensors 22 of the first sensors 21 will be referred to as "0." The direction including the first sensors 21 will be referred to as an X-axis, and the direction toward the range provided with the second sensors 22, orthogonal to the X-axis, will be referred to as a Y-axis.

The hand width detection unit 61 sequentially checks the output signals of the first sensors 21 (signals indicating the electrostatic capacity of the corresponding sensors 21S, that is, detection values) from the first sensor 21A.

The hand width detection unit 61 obtains the detection values output by the corresponding first sensors 21A, B . . . at the positions in the coordinate system corresponding to the centers of the first sensors 21A, B . . . in the width direction as illustrated in FIG. 7. The hand width detection unit 61 interpolates the detection values of the first sensors 21A, B . . . to determine estimated detection values between adjacent first sensors 21 (position between center coordinates of a pair of first sensors 21 adjacent to each other).

Specifically, in the example here, the detection values of a pair of first sensors 21 adjacent to each other are linearly interpolated for each pair of first sensors 21 to thereby calculate an estimated detection value at the position between the pair of first sensors 21.

The hand width detection unit 61 searches for coordinates in which the detection value obtained here or the estimated detection value obtained by interpolation is below a predetermined threshold for contact determination. That is, the hand width detection unit 61 searches for a point where a broken line or a curve connecting the estimated detection values (or detection values) intersects a line segment representing the value of the threshold for contact determination as illustrated in FIG. 7.

FIG. 7(*a*) illustrates a case in which the base of the middle finger is at the position of the first sensor 21A, and the base of the little finger is between the first sensors 21D and 21E, closer to the first sensor 21D (note that the position of the swing button 17 and the position of the first sensor 21A are experimentally adjusted so that the middle finger of the user is positioned on an extension line of the center line of the first sensor 21A in the width direction (first sensor 21 in the arrangement direction) when the user naturally holds the controller apparatus 1).

In this case, as for the detection values of the first sensors 21, the detection values of the first sensors 21A to 21D indicate that the hand (or the fingers) of the user is in contact as illustrated in FIG. 7(*a*). In addition, the first sensor 21D is touched by the hand (or the finger) of the user but is closer to the end of the hand or the finger of the user. Therefore, the detection value of the first sensor 21D is relatively small compared to the detection values of the first sensors 21A to 21C. In addition, the hand or the fingers of the user are not close to the first sensor 21E, and the detection value of the first sensor 21E is substantially "0" (although the detection value is actually not "0" due to the influence of noise, the detection value is so small that the value can be assumed to be "0").

The hand width detection unit 61 obtains linear interpolation P between pairs of first sensors 21 adjacent to each other, that is, between the first sensors 21A and 21B, between the first sensors 21B and 21C, between the first sensors 21C and 21D, . . . (value obtained by using a line segment to connect and interpolate the detection values of the pair of first sensors 21 adjacent to each other).

The hand width detection unit 61 searches for a point Q at which the value of the result of the linear interpolation is equal to the threshold for contact determination. Here, there is no point at which the result of linear interpolation is below the threshold for contact determination between the first sensors 21A and 21B, between the first sensors 21B and 21C, or between the first sensors 21C and 21D in which the detection values of the adjacent first sensors 21 exceed the threshold for contact determination. However, between the first sensor 21D and the first sensor 21E, a detection value Vd of the first sensor 21D (center is at coordinates xd) exceeds the threshold for contact determination, and a detection value Ve of the first sensor 21E (center is at coordinates xe) is below the threshold for contact determination. Therefore, the linear interpolation results include a point Q equal to a threshold Vth for contact determination, and coordinates of the point are obtained as a solution of an equation (Vd−Ve)·xq/(xd−xe)+Vd=Vth. The hand width detection unit 61 numerically solves the equation to acquire information of the coordinates at the position of the point Q. Note that in a case where the point Q is not found, the X coordinate of the point Q is set to a value at the position of the X-axis of the first sensor 21 with the largest value of the X-axis at the position among the first sensors 21 (here, "6.0" of the first sensor 21F).

Furthermore, the hand width detection unit 61 detects, as a range of the hand width of the user, a range from an end (end on the side away from the first sensor 21B) R of the first sensor 21A to the point Q.

In a method in which interpolation, such as linear interpolation, is not used, the hand width of the user is determined to be a range up to the first sensor 21C in this example. However, in the example here in which the interpolation is performed, the information of the hand width of the user can be more precisely acquired.

Furthermore, in the example, the allocation setting unit 62 refers to the value output by the hand width detection unit 61 to select, from the plurality of second sensors 22, the second sensor 22 that detects bending and extending of each of the middle finger, the ring finger, and the little finger of the user as follows and outputs information for specifying the selected second sensor 22.

In the example of the present embodiment, the position of each finger in the X-axis direction with respect to the hand width is determined in advance as a ratio with respect to the value of the hand width. Specifically, when the hand width detected by the hand width detection unit 61 (length from the position between the middle finger and the index finger to the outer end of the little finger) is Wh, the center position of the middle finger (indicated by the distance from the position between the middle finger and the index finger, the same applies hereinafter) is Wh·αm. The center position of the ring finger is Wh·αr, and the center position of the little finger is Wh·αs. These αm, αr, and αs (αm<αr<αs) are determined in advance. Note that certain second sensors 22, such as the second sensors 22A and 22G, may be always set for the middle finger. In this case, αm does not have to be set.

The allocation setting unit 62 acquires information of the coordinates at the center position of each of the middle finger, the ring finger, and the little finger of the user based on the setting. Specifically, when, for example, αr=0.45 and αs=0.74 are set, the coordinate of the middle finger in the X-axis direction is αr×Wh=2.34, and the coordinate of the ring finger in the X-axis direction is αs×Wh=3.7 when the hand width is Wh=5.2 in the example of FIG. 7(a). Therefore, the allocation setting unit 62 estimates that the middle finger is positioned at the center of the second sensor 22A, the ring finger is positioned between the second sensors 22B and 22C, and the little finger is positioned between the second sensors 22C and 22D in the same group as the second sensor 22A. In addition, the allocation setting unit 62 estimates that the middle finger is positioned at the center of the second sensor 22G, and the ringer finger and the little finger (for operating buttons) are positioned at the second sensor 22H and the second sensor 22I, respectively, in the same group as the second sensor 22G.

In addition, when it is estimated that the hand width is Wh=6 in the example of FIG. 7(b), the coordinate of the middle finger in the X-axis direction is αr×Wh=2.7, and the coordinate of the ring finger in the X-axis direction is αs×Wh=4.44. Therefore, the allocation setting unit 62 estimates that the middle finger is positioned at the center of the second sensor 22A, the ring finger is positioned between the second sensors 22B and 22C, and the little finger is positioned between the second sensors 22D and 22E in the same group as the second sensor 22A. In addition, the allocation setting unit 62 estimates that the middle finger is positioned at the center of the second sensor 22G, and the ring finger and the little finger (for operating buttons) are positioned at the second sensor 22H and the second sensor 22I, respectively, in the same group as the second sensor 22G.

That is, the allocation setting unit 62 determines the second sensor 22 that acquires the information regarding the state of bending and extending of each of the middle finger, the ring finger, and the little finger of the user for each of the groups of second sensors 22 at different positions in the Y-axis direction.

In the example of FIGS. 7(a) and 7(b), a line of second sensors 22A to 22F and a line of second sensors 22G to 22I are arranged, and the groups of second sensors 22 at different positions in the Y-axis direction include a group of second sensors 22A to 22F and a group of second sensors 22G to 22I. Furthermore, it is assumed here that each sensor is arranged so that the position of the second sensor 22A in the X-axis direction is "1.0," the position of the second sensor B in the X-axis direction is "2.0," . . . .

For the second sensors 22 included in each group, (1) when the coordinates of each of the middle finger, the ring finger, and the little finger of the user indicated in the acquired information match center coordinates X of one of the second sensors 22 (referred to as a second sensor 22x) included in the group, the allocation setting unit 62 sets, to the second sensor 22x, the second sensor 22 that detects bending and extending of the finger.

On the other hand, (2) when the coordinates of each of the middle finger, the ring finger, and the little finger of the user indicated in the acquired information do not match the center coordinates of any of the second sensors 22 included in the group, the allocation setting unit 62 searches for the second sensor 22x closest to the acquired coordinates and a next closest second sensor 22y.

Furthermore, the allocation setting unit 62 sets the two second sensors 22x and y found by the search as second sensors 22 that detect bending and extending of the finger.

As a result of the process, for each of the groups of second sensors 22 (group in Y-axis direction), the second sensors 22 that detect bending and extending of each of the middle finger, the ring finger, and the little finger of the user are set.

For example, in the example of FIG. 7(a), the middle finger is estimated to be positioned at the center of the second sensor 22A, the ring finger is estimated to be positioned between the second sensors 22B and 22C, and the little finger is estimated to be positioned between the second sensors 22C and 22D in the same group as, for example, the second sensor 22A. Therefore, the second sensors 22A and G are set as the second sensors 22 that detect bending and extending of the middle finger. The second sensors 22B and C and 22H are set as the second sensors 22 that detect bending and extending of the ring finger. The second sensors 22C and D and 22I are set as the second sensors 22 that detect bending and extending of the little finger.

The finger detection unit 63 generates and outputs information indicating the state of bending and extending of each finger of the user based on the output of the second sensors 22 set to detect bending and extending of each finger according to the setting of the allocation setting unit 62.

Specifically, if there is one second sensor 22 set to detect bending and extending of each finger in a group of second sensors 22, the finger detection unit 63 outputs the information output by the second sensor 22 as information indicating bending and extending of the corresponding finger.

In addition, if there are two second sensors 22 set to detect bending and extending of each finger in a group of second sensors 22, the finger detection unit 63 obtains the information indicating bending and extending of the corresponding finger as follows.

That is, information V indicating bending and extending of the finger to be calculated is $$V=(V\alpha \cdot |X\alpha-Xf|+V\beta \cdot |X\beta-Xf|)/|X\beta-X\alpha|$$

(here, |x| denotes absolute value of x),
where Xα and Xβ represent the positions of the two second sensors 22 in the X-axis direction, Vα and Vβ represent the detection values, and Xf represents the X coordinate at the position of the corresponding finger obtained by the allocation setting unit 62. In such a way, the finger detection unit 63 weights and averages the detection values of each second sensor 22 according to the distance from each second sensor 22 (center of second sensor 22) to the finger (center of finger). The finger detection unit 63 thereby estimates the detection value at the center of the finger and outputs the estimated detection value as information indicating bending and extending of the corresponding finger.

The output unit 54 transmits, to the information processing apparatus 2, information corresponding to the displacement in spatial position between each finger output by the finger detection unit 63 and the surface of the controller apparatus 1 (handled as information indicating the state of bending and extending of the middle finger, the ring finger, and the little finger).

[Calibration]

In addition, individual detection results may vary in each sensor 22S of the second sensor 22. That is, electrostatic capacity CO in a case where the finger is not close generally varies.

Therefore, in an example of the present embodiment, an output (hereinafter, referred to as reference electrostatic capacity for convenience) CO in the state in which the detection target is not close is measured in advance for each sensor 22S of the second sensor 22 in the manufacturing of the controller apparatus 1, and the reference electrostatic capacity of the sensor 22S specified in the information is recorded in the memory of the control circuit 19 in association with the information for specifying the sensor 22S.

In the example, the control circuit 19 may use, in the process of the finger detection unit 53, for example, a signal (information indicating the electrostatic capacity of the corresponding sensor 22S) $Ci$ output by a sensor circuit 22Ti of each second sensor $22i$ and reference electrostatic capacity $Ci0$ stored in association with the sensor 22S to calculate a value Ciout to be output as a signal detected by the second sensor $22i$ as follows (i=A, B, . . . ).

Ciout=floor[(Ci−Ci0)/(Cmax−Ci0)×Coutmax] Here, Cmax represents a value of the maximum electrostatic capacity measured, and Coutmax represents a maximum value of the output signal (for example, "255" in the case of 8 bits). In addition, floor[X] represents that a maximum integer not exceeding the calculated value of X is to be calculated.

In such a way, the ratio of the change from the reference electrostatic capacity with respect to the dynamic range (measurable range) of the sensor 22S is output as a detection result, and calibration of each sensor can be performed.

Note that similar calibration may also be performed for the sensor 21S of the first sensor 21.

In this case, the reference electrostatic capacity CO is similarly measured for each sensor 21S, and the value is stored in the corresponding sensor circuit 21T. Furthermore, the sensor circuit 21T compares the electrostatic capacity (C) of the corresponding electrostatic sensor 21S and a corrected threshold Cth' obtained by adding the reference electrostatic capacity CO to the predetermined threshold Cth. The sensor circuit 21T outputs Coutmax (maximum value of output signal, such as "255" in the case of 8 bits) when the electrostatic capacity C of the electrostatic sensor 21S exceeds the corrected threshold Cth'. The sensor circuit 21T outputs Countmin (minimum value of output signal, such as "0" in the case of 8 bits) otherwise.

[Detection Threshold of Contact State of Finger]

In the present embodiment, the detection threshold of the contact state of finger may also be corrected to a lower detection threshold. That is, the control circuit 19 may use, in the process of the finger detection unit 53, the signal (information indicating the electrostatic capacity of the corresponding sensor 22S) $Ci$ output by the sensor circuit 22Ti of each second sensor $22i$ to calculate the value Ciout to be output as a signal detected by the second sensor $22i$ as follows (i=A, B, . . . ).

Ciout=f[Ci/C'max×Coutmax] Here, f[X] is a function representing a maximum integer not exceeding X when X does not exceed Coutmax and representing Coutmax when X exceeds Coutmax. In this case, C'max is set to a value smaller than the maximum value Cmax of Ci (C'max<Cmax). In such a way, the value of Coutmax is output when Ci is equal to or greater than C'max. Therefore, Cmaxout is output even if the finger is out of position a little and partially touches the sensor 22S selected as a sensor that detects the finger, instead of the entire sensor 22S, so that the output value of Ci is lower than the original maximum value of Ci. The finger can be identified as a finger in the contact state.

Furthermore, calibration of the sensor 22S may also be performed in this example. In this case, the control circuit 19 uses, in the process of the finger detection unit 53, for example, the signal (information indicating the electrostatic capacity of the corresponding sensor 22S) Ci output by the sensor circuit 22Ti of each second sensor $22i$ and the reference electrostatic capacity Ci0 stored in association with the sensor 22S to calculate the value Ciout to be output as a signal detected by the second sensor $22i$ as follows (i=A, B, . . . ).

Ciout=f[(Ci−Ci0)/(C'max−Ci0)×Coutmax] Here, f[X] and C'max are similar to the ones described above.

Note that the value of C'max here (referred to as threshold correction value) may be set by an instruction from the information processing apparatus 2. According to the example, the information processing apparatus 2 can execute a process of setting the value of C'max to a value as close to Cmax as possible to widen the dynamic range of the detection of bending and extending of the finger and setting C'max to make Cmax−C'max relatively large to surely acquire the contact of the finger.

[Detection of Index Finger]

In addition, the second sensor 22 that detects the displacement in spatial position with respect to the fingertip of the index finger and that outputs the information corresponding to the detected displacement in spatial position with respect to the fingertip may be arranged on the button top of the swing button 17 (part where the fingertip of the user comes into contact when the user operates the swing button 17).

[Process on Information Process Apparatus Side]

Next, an example of a process in the information processing apparatus 2 based on the information transmitted by the controller apparatus 1 of the present embodiment will be described.

The information processing apparatus 2 connected to the controller apparatus 1 of the present embodiment repeatedly receives, from the controller apparatus 1, the information indicating the detection result of the hand width and the information indicating the amounts of bending and extending of the fingers from the middle finger to the little finger along with the details of the operation of the joystick 15 or the button operation unit 16 and the information indicating the amount of push of the swing button 17 at each predetermined timing (for example, at timing of once in 1/60 seconds).

As already described, the information indicating the amount of bending and extending of each finger from the middle finger to the little finger is information indicating "0" when the finger is extended and indicating the maximum value (for example, "255" in the case of 8-bit information) in the state in which the finger is bent and in contact with the grip unit 11. In addition, the information indicating the hand width corresponds to the number of first sensors 21 that detect the contact of the fingers or the palm of the hand (the number of first sensors 21 that detect the contact of the fingers or the like continuously from the first sensor 21 on the index finger side) when the user mounts the controller apparatus 1 on the hand.

The information processing apparatus 2 uses the information indicating the amount of bending and extending of each finger from the middle finger to the little finger and the like to execute a process of a game application and may also execute, for example, a process of determining whether or not the way of holding the controller apparatus 1 is appropriate.

[Determination of Way of Holding]

In the process, the information processing apparatus 2 operates as follows. The information processing apparatus 2 may refer to the information indicating the detection result of the hand width and the information indicating the amount of bending and extending of each finger from the middle finger to the little finger to determine the way the user holds the controller apparatus 1.

Specifically, the information processing apparatus 2 refers to the detection results of the first sensors 21 of the controller apparatus 1, that is, the number Nw of first sensors 21 that detect the contact of the fingers or the like continuously from the first sensor 21A on the index finger side, that are information indicating the detection result of the hand width.

In addition, the information processing apparatus 2 refers to the information indicating the amount of bending and extending of each finger from the middle finger to the little finger and determines that the way of holding the controller apparatus 1 is abnormal in a case where at least one piece of information indicating the amount of bending and extending of each finger from the middle finger to the little finger (or a plurality of or all of the pieces of information) indicates that the information (detection value) corresponding to the displacement in spatial position with respect to the finger is below a predetermined threshold (in a case where the information indicates that the finger is bent and is in contact with or close to the controller apparatus 1) when the number Nw of first sensors 21 is below a predetermined threshold.

For example, in a case where the user grips the controller apparatus 1 without putting the hand into the fixation unit 20, the user touches the second sensors 22 without touching the first sensors 21, and such a situation occurs.

When the information processing apparatus 2 determines that the way of holding the controller apparatus 1 is abnormal, the information processing apparatus 2 alerts the user by, for example, displaying a guide, such as "use the fixation tool to correctly mount the controller apparatus," on a display or the like not illustrated.

Alternatively, when the information processing apparatus 2 determines that the way of holding the controller apparatus 1 is abnormal, the information processing apparatus 2 may discard the information regarding the operation of the user received from the controller apparatus 1 (may perform control not to use the information in the process and the like of the game application). In such a way, the controller apparatus 1 can perform an action, such as prohibiting the operation of the game or the like unless the controller apparatus 1 is gripped in an intended manner.

Furthermore, in another example, when there are two types of controller apparatus 1 including the controller apparatus 1 for left hand (the fixation tool 20 is arranged on the left side of the controller apparatus 1) and the controller apparatus 1 for right hand (the fixation tool 20 is arranged on the right side of the controller apparatus 1), the information processing apparatus 2 may determine that the user is holding the controller apparatuses 1 the wrong way around and output a guide indicating this on the display or the like if the numbers Nw of first sensors 21 in the controller apparatuses 1 are below the predetermined threshold and all of the information (or part of the information) indicating the amount of bending and extending of each finger from the middle finger to the little finger received from the controller apparatuses 1 indicates that the fingers are in contact (output values are maximum values).

Furthermore, in an example of the present embodiment, the control circuit 19 of the controller apparatus 1 may include an acceleration sensor that detects acceleration applied to the controller apparatus 1 and may output information indicating the acceleration detected by the acceleration sensor to the information processing apparatus 2.

In this case, the information processing apparatus 2 may also determine that the controller apparatus 1 is handled abnormally and output a guide for correctly mounting the controller apparatus 1 on the display or the like when the value indicated by the acceleration sensor exceeds a predetermined threshold in the state in which the number Nw of first sensors 21 is below the predetermined threshold.

Note that although the information processing apparatus 2 here outputs the guide or the like for correctly mounting the controller apparatus 1 to the display or the like, the present embodiment is not limited to this. For example, sound may be used to notify the user of the guide or the like. When the control circuit 19 of the controller apparatus 1 includes a device, such as a vibrator and a haptic device, that provides vibration or sense of touch to the user, the information processing apparatus 2 may instruct the controller apparatus 1 to drive the device to draw attention in relation to the mounting state.

[Correction of Joystick]

The joystick 15 detects the information indicating the tilt direction and the tilt angle, and the operation target, such as a stick, titled and operated in the joystick 15 is energized to return to the origin (position where the tilt angle is zero degrees) when the user releases the fingers.

However, when the added force returns the operation target to the origin, the operation target may not always return to the position where the tilt angle is zero degrees depending on manufacturing variations of the components of the joystick 15 or handling of the user, and there may be a return error. Therefore, when the information processing apparatus 2 detects a tilt angle less than an angle $\Delta\theta$ set in advance as a range of return error, the information processing apparatus 2 conventionally ignores the output of the joystick 15 to determine that the joystick 15 is not tilted (tilt angle is "0") and executes the process (what is called a dead zone is provided).

In this case, although this eliminates false detection caused by a return error, the operable range (dynamic range) of the joystick 15 is reduced. In a case of a relatively small joystick mounted on a small device, such as the controller apparatus 1 mounted on the hand, there is a problem in operability.

Therefore, in the present embodiment, the finger sensor 23 that detects the displacement in spatial position with respect to the thumb may be arranged at the top of the stick 15S as an operation target of the joystick 15 (position touched by the thumb of the user in operating the joystick 15), and the output of the finger sensor 23 may be used to cause the information processing apparatus 2 to execute a process of enlarging the dynamic range.

Figure 8:
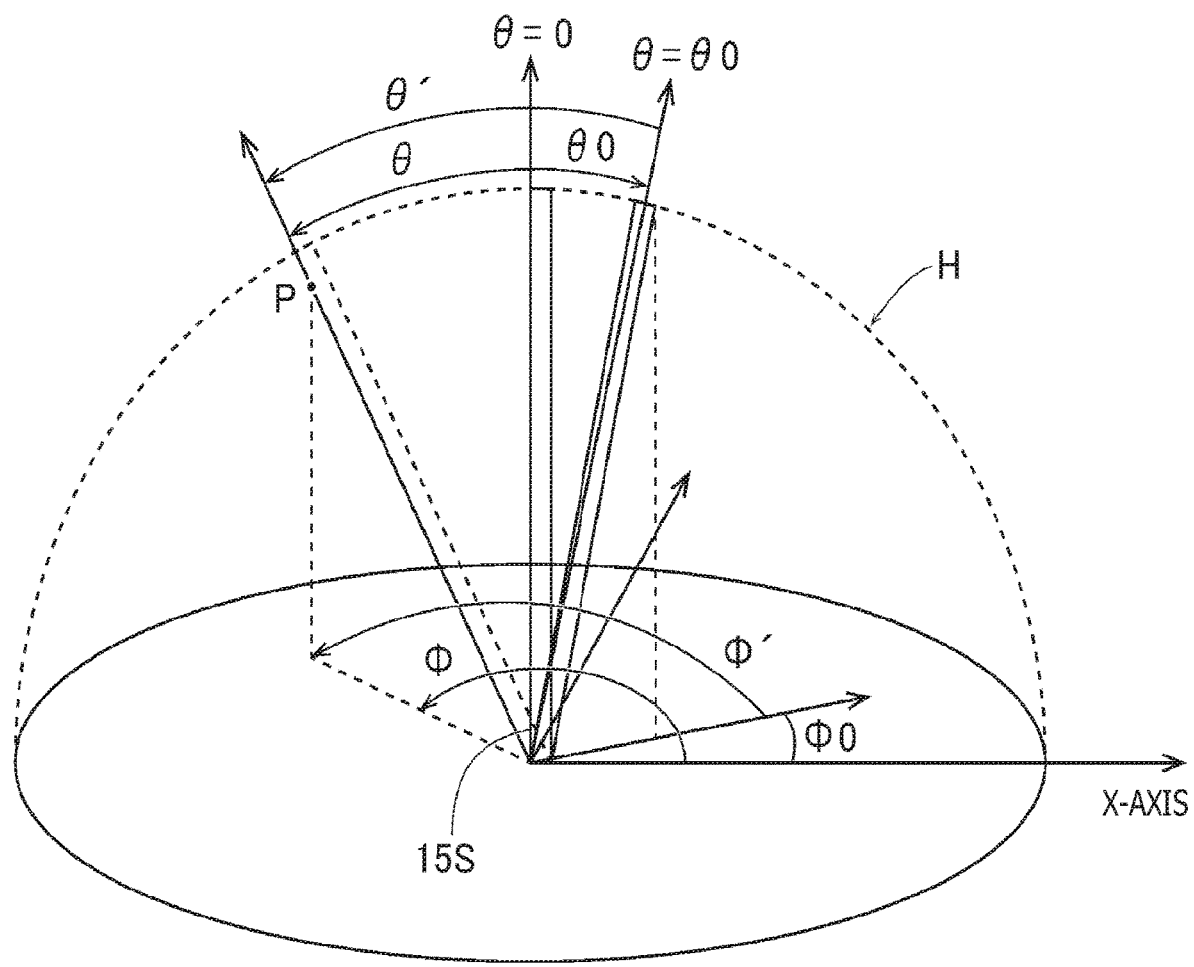
FIG. 8 is an explanatory diagram illustrating an example of a correction method of a detection result of a joystick in the controller apparatus according to the embodiment of the present invention.

Specifically, the information processing apparatus 2 records, as origin direction information, information $\varphi 0$ indicating the tilt direction and information $\theta 0$ of the tilt angle output by the joystick 15 when the finger sensor 23 is outputting a signal indicating that the thumb is not in contact (when the information (detection value) corresponding to the displacement in spatial position with respect to the finger is greater than the predetermined threshold) (FIG. 8).

Furthermore, once the information processing apparatus 2 subsequently acquires information of a direction of the stick 15S of the joystick 15 (line segment from the base of the stick 15S toward the direction of the top) expressed by the information φ indicating the tilt direction and the information θ of the tilt angle output by the joystick 15, the information processing apparatus 2 operates as follows.

That is, as illustrated in FIG. 8, the information processing apparatus 2 obtains a position P where the virtual line segment indicated in the acquired information intersects a virtual spherical surface H around the base of the stick 15S and corrects the tilt direction φ and the tilt angle θ at the position P (tilt direction and tilt angle as viewed from the base of the stick 15S) where the origin is θ=0 to a tilt direction φ' and a tilt angle θ' as viewed from the base of the stick 15S where the origin is φ=φ0, θ=θ0.

Note that in the example here, a predetermined direction (for example, horizontal direction of the right surface side when the controller apparatus 1 is set up on the floor surface) is set as the X-axis in a plane (virtual plane) parallel to the surface of the operation unit 12 where the base of the stick 15S is arranged, and the angle from the X-axis is used to set the tilt direction φ in the example.

According to the example of the present embodiment, the dead zone does not have to be provided, and the operability of the joystick 15 improves.

REFERENCE SIGNS LIST

1 Controller apparatus, 2 Information processing apparatus, 10 Controller body, 11 Grip unit, 12 Operation unit, 15 Joystick, 16 Button operation unit, 17 Swing button, 18 Button, 19 Control circuit, 20 Fixation tool, 21 First sensor, 22 Second sensor, 23 Finger sensor, 51, 61 Hand width detection unit, 52, 62 Allocation setting unit, 53, 63 Finger detection unit, 54 Output unit.

The invention claimed is:

1. An information processing system comprising:
a controller apparatus that is mounted on a hand of a user; and
an information processing apparatus,
the controller apparatus including
a controller body,
first sensors arranged at positions on the controller body where a plurality of fingers of the user comes into contact when the user grasps the controller body, the first sensors configured to detect displacement in spatial position between the plurality of fingers of the user and the first sensors,
buttons that are arranged at positions where fingertips of the user reach and that is operated by corresponding fingers, and
a plurality of second sensors arranged between the first sensors and the buttons and on surfaces of the buttons, the second sensors configured to detect displacement in spatial position between the plurality of fingers of the user and the second sensors, wherein
the information processing apparatus receives detection results of the first sensors and the second sensors and executes a process of determining a mounted state of the controller apparatus based on the detection results of the first sensors and the second sensors.

2. A controller apparatus mounted on a hand of a user, the controller apparatus comprising:
a controller body;
first sensors arranged at positions on the controller body where a plurality of fingers of the user comes into contact when the user grasps the controller body, the first sensors configured to detect displacement in spatial position between the plurality of fingers of the user and the first sensors;
buttons that are arranged at positions where fingertips of the user reach and that is operated by corresponding fingers; and
a plurality of second sensors arranged between the first sensors and the buttons and on surfaces of the buttons, the second sensors configured to detect displacement in spatial position between the plurality of fingers of the user and the second sensors.

3. The controller apparatus according to claim 2, wherein the first sensors are arranged at positions corresponding to base parts of the plurality of fingers of the user when the user grasps the controller body.

4. An information processing apparatus connected to a controller apparatus, the controller apparatus including
first sensors arranged at positions on a controller body where a plurality of fingers of the user comes into contact when the user grasps the controller body, the first sensors configured to detect displacement in spatial position between the plurality of fingers of the user and the first sensors,
buttons that are arranged at positions where fingertips of the user reach and that is operated by corresponding fingers, and
a plurality of second sensors arranged between the first sensors and the buttons and on surfaces of the buttons, the second sensors configured to detect displacement in spatial position between the plurality of fingers of the user and the second sensors, the information processing apparatus comprising:
means for receiving detection results of the first sensors and the second sensors; and
means for executing a process of determining a mounted state of the controller apparatus based on the detection results of the first sensors and the second sensors.

5. A non-transitory, computer readable storage medium containing a computer program, which when executed by an information processing apparatus connected to a controller apparatus, the controller apparatus including first sensors arranged at positions on a controller body where a plurality of fingers of the user comes into contact when the user grasps the controller body, the first sensors configured to detect displacement in spatial position between the plurality of fingers of the user and the first sensors, buttons that are arranged at positions where fingertips of the user reach and that is operated by corresponding fingers, and a plurality of second sensors arranged between the first sensors and the buttons and on surfaces of the buttons, the second sensors configured to detect displacement in spatial position between the plurality of fingers of the user and the second sensors, causes the information processing apparatus to carry out actions, comprising:
receiving detection results of the first sensors and the second sensors; and
executing a process of determining a mounted state of the controller apparatus based on the detection results of the first sensors and the second sensors.

* * * * *